United States Patent Office 3,272,841
Patented Sept. 13, 1966

3,272,841
α-(AMINOALKOXYPHENYL)-α'-NITRO-
STILBENE COMPOUNDS
Horace A. De Wald, Ann Arbor, Mich., assignor to Parke,
Davis & Company, Detroit, Mich., a corporation of
Michigan
No Drawing. Filed Mar. 23, 1964, Ser. No. 354,104
5 Claims. (Cl. 260—326.5)

The present invention relates to new organic nitro compounds. More particularly, it relates to new α-(aminoalkoxyphenyl) - α' - nitrostilbene compounds, to acid-addition and quaternary ammonium salts thereof, and to methods for their production.

In the forms of their free bases, the compounds of the invention can be represented by the structural formula

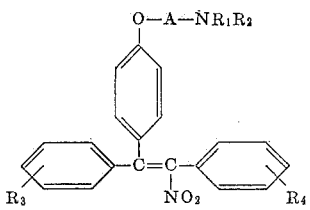

In this formula, A represents ethylene or propylene; each of $R_1$ and $R_2$ represents lower alkyl, or $R_1$ and $R_2$ are combined and together represent oxydiethylene, or lower alkylene of 4, 5, 6, 7, or 8 carbon atoms, 4 or 5 of which carbon atoms are in annular position with the nitrogen atom to which they are attached; and each of $R_3$ and $R_4$ represents hydrogen, lower alkyl, lower alkoxy, halogen, or trifluoromethyl. When $R_1$ and $R_2$ are combined and represent oxydiethylene, the group—$NR_1NR_2$ represents the morpholino radical. When $R_1$ and $R_2$ are combined and represent lower alkylene, the group—$NR_1NR_2$ represents a pyrrolidino, lower alkylpyrrolidino, piperidino, or lower alkylpiperidino radical. In the compounds of the invention, the preferred lower alkyl groups are methyl and ethyl; the preferred lower alkoxy groups are methoxy and ethoxy; the preferred halogen is chlorine; and the group A is preferably ethylene.

According to the invention, the foregoing compounds are produced by reacting a triarylethanol compound of the formula

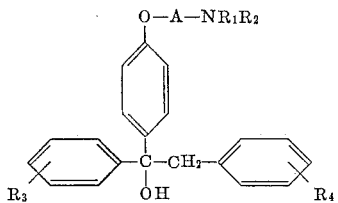

or a triarylethylene compound of the formula

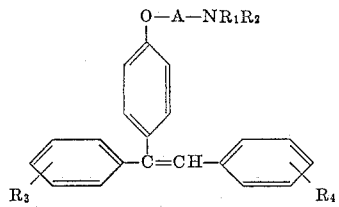

with nitric acid; where A, $R_1$, $R_2$, $R_3$ and $R_4$ are as defined before. At least 1 and preferably up to 4 moles or more of nitric acid are used for each mole of the triarylethanol or triarylethylene compound. The concentration of the nitric acid and the time and temperature of the reaction depend somewhat on the nature of the groups substituted on the aromatic rings, but in general the reaction is carried out at a temperature of about 20 to 100° C. for from 1 minute to several hours, the shorter reaction times being used with the higher temperatures. The reaction is preferably carried out using fuming nitric acid at 40–65° C. for from 5–20 minutes. If activating groups are present, lower concentrations of nitric acid can also be successfully employed. Some suitable solvents for the reaction are alkanoic acids such as acetic acid or propionic acid, as well as carbon tetrachloride and other halogenated hydrocarbons. The product can be isolated directly as the nitrate salt; following basification as the free base; or following basification and subsequent salt formation, as an acid-addition or quaternary ammonium salt.

In the foregoing process, it is not critical whether the starting material selected for use is the triarylethanol compound or the triarylethylene compound since the former can be converted into the latter by dehydration during the course of the reaction with nitric acid. For the same reason a mixture of the triarylethanol compound and the triarylethylene compound can be used as a starting material with entirely satisfactory results. The triarylethanol compounds can be produced by the reaction of a benzophenone compound of the formula

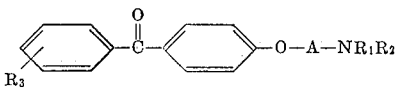

with a benzylmagnesium halide compound of the formula

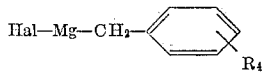

in an anhydrous ethereal solvent, followed by hydrolysis of the reaction mixture with ammonium chloride solution; where A, $R_1$, $R_2$, $R_3$, and $R_4$ are as defined before and Hal is halogen, preferably chlorine or bromine. The triarylethylene compounds are produced by dehydration of the triarylethanol compounds, as by treatment with mineral acids. The dehydration can be carried out by heating with 85% phosphoric acid for one hour at 90–100° C. The triarylethylene compounds can also be obtained directly from the reaction of the benzophenone derivative and benzylmagnesium halide derivative by using mineral acid for hydrolysis of the reaction mixture, with a longer time or higher temperature during the hydrolysis. On the other hand, prolonged treatment with mineral acid is avoided if it is desired to obtain the triarylethanol compound. In any particular case, the identity of the reaction product as the triarylethanol compound or the triarylethylene compound can be conveniently checked by examining the infrared absorption spectrum for hydroxyl absorption. Strong hydroxyl absorption indicates that the product is the triarylethanol compound whereas absence of such absorption indicates that dehydration has occurred and the product is the triarylethylene compound. Weak hydroxyl absorption indicates that a mixture of the two has been formed.

The benzophenone compounds of the formula shown above can be prepared by any of a variety of methods. For example, they can be prepared by reacting a 4-hydroxybenzophenone compound of the formula

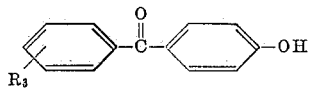

with an aminoalkyl halide of the formula

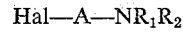

in the presence of sodium hydride; where A, $R_1$, $R_2$, and $R_3$ are as defined before and Hal represents halogen, preferably chlorine. The benzophenone compounds can also be obtained by reacting a benzonitrile derivative of the formula

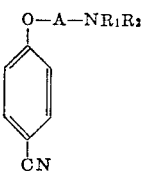

with an arylmagnesium halide of the formula

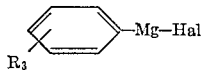

in an ethereal solvent, followed by hydrolysis of the reaction mixture with ammonium chloride solution and further hydrolysis of the reaction product by heating it with mineral acid; where A, $R_1$, $R_2$, and $R_3$ are as defined before and Hal represents halogen. In all cases, the respective free bases are obtained following neutralization or basification.

Also in accordance with the invention, the foregoing nitrostilbene compounds of the invention are produced by reacting a triarylethylene compound of the formula

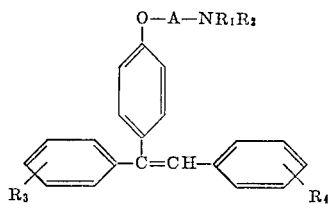

with a lower alkanoyl nitrate to produce a compound having in free base form the formula

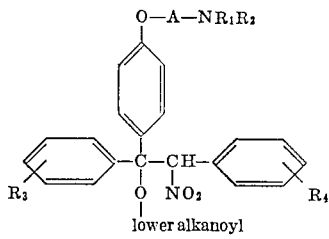

followed by heating the compound so produced with a strong acid, whereby elimination of the elements of a lower alkanoic acid occurs with introduction of a double bond; where A, $R_1$, $R_2$, $R_3$, and $R_4$ are as defined before. The preferred lower alkanoyl nitrate is acetyl nitrate. The first step of the process is carried out by reacting the triarylethylene compound with at least one equivalent or up to a moderate excess of the lower alkanoyl nitrate. The reaction is moderated by external cooling with the temperature maintained between $-25$ to $+10°$ C. A suitable solvent for the reaction is a lower alkanoic acid anhydride and the reaction is most commonly carried out following the production of acetyl nitrate in situ from the reaction of nitric acid and acetic anhydride. The second step of the process is carried out by heating the intermediate 1-alkanoyloxy-2-nitro derivative of the preceding formula with a strong acid. Some examples of suitable strong acids are phosphoric acid, sulfuric acid, and p-toluenesulfonic acid. It is customary to employ a large excess of the strong acid without added solvent but if desired an additional unreactive solvent such as a halogenated hydrocarbon can be used. Heating with the strong acid is usually carried out at from 80–120° C. for from 15 minutes to 2 hours although satisfactory results are also obtained by operating somewhat outside of these limits. The product can be isolated directly as an acid-addition salt; following basification as the free base; or following basification and subsequent salt formation, as an acid-addition or quaternary ammonium salt.

The free bases of the invention form acid-addition salts with a variety of inorganic and organic acids. Pharmaceutically-acceptable acid-addition salts are formed with acids such as hydrochloric, hydrobromic, hydriodic, sulfuric, acetic, benzoic, citric, maleic, malic, gluconic, ascorbic and related acids. The acid-addition salts can be formed by the reaction of the free base with the selected acid, by metathesis, by ion exchange, or by other salt forming means. The free bases of the invention also form quaternary ammonium salts. Pharmaceutically-acceptable quaternary ammonium salts are formed with salt forming agents such as methyl iodide, ethyl chloride, ethyl bromide, ethyl iodide, benzyl chloride, and methyl p-toluenesulfonate. The free bases and salts are generally equivalent for the purposes of the invention except that one or the other may be preferred for particular solubility properties. Both the free bases and salts of the invention can exist as cis-trans isomers.

The compounds of the invention are useful pharmacological agents and in particular exhibit anti-estrogenic, hypocholesteremic and anti-fertility activity. The anti-estrogenic effect is measured by administering the test compound and a standard estrogen such as estradiol to ovariectomized test animals and at the end of the test period comparing the uterine weight with the uterine weight of ovariectomized animals receiving a standard estrogen without an anti-estrogen. In this assay high anti-estrogenic activity is associated with low uterine weight. As hypocholesteremic agents, they cause a decrease in the level of blood cholesterol. A preferred anti-estrogenic and anti-fertility compound of the invention is α-[p-(2-pyrrolidinoethoxy)phenyl]-α-nitro-4-methoxystilbene. A preferred hypocholesteremic compound of the invention is α-[p-(2-diethylaminoethoxy)phenyl]-α'-nitro-4-methoxystilbene. The compounds of the invention are active upon oral administration but can also be given by the parenteral route if desired.

The invention is illustrated by the following examples.

*Example 1*

With stirring, 10 g. of fuming nitric acid (specific gravity 1.5) is added dropwise to a solution of 10 g. of 1-[p-(2-diethylaminoethoxy)phenyl]-1,2-diphenylethanol in 100 ml. of acetic acid. The reaction mixture warms to approximately 45° C. during the addition period and is then heated at 65° C. for 10 minutes and poured into 600 ml. of ice water. The resulting mixture is made basic to pH 10–11 with sodium hydroxide, and extracted with chloroform. The chloroform solution is washed with sodium chloride solution, dried over magnesium sulfate and evaporated under reduced pressure to give a residue of α-[p-(2-diethylaminoethoxy)phenyl]-α'-nitrostilbene; M.P. 87–89° C. following crystallization from methanol. The maleate salt is obtained by dissolving 4.5 g. of the base in 15 ml. of methanol, adding 1.2 g. of maleic acid and adding water to precipitate the product. The maleate salt is collected on a filter and purified by crystallization from methanol-ether.

*Example 2*

By the procedure of Example 1, with the substitution of an equivalent amount of 1-[p-(2-dimethylaminoethoxy)phenyl]-1-phenyl-2-(o-tolyl)-ethanol for the 1-[p-(2-diethylaminoethoxy)phenyl]-1,2-diphenylethanol, the product obtained is α-[p-(2-dimethylaminoethoxy)phenyl]-α'-nitro-2'-methylstilbene; M.P. 53–56° C. following crystallization from methanol. The monocitrate salt is obtained by adding a warm solution of 4.5 g. of the base in 15 ml. of methyl ethyl ketone to a warm solution of 2 g. of citric acid in 15 ml. of methyl ethyl ketone. The resulting mixture is chilled and the insoluble monocitrate salt is collected on a filter and washed with ether.

The starting material is obtained as follows. With stirring, a solution of 18.5 g. of o-methylbenzyl bromide in 20 ml. of ether is added over a period of 15 minutes to 3.0 g. of magnesium in 150 ml. of ether. The resulting mixture containing o-methylbenzylmagnesium bromide is maintained at reflux during the addition. A solution of 13.5 g. of 4-(2-dimethylaminoethoxy)-benzophenone in 120 ml. of ether is then added gradually and heating under reflux is continued for two hours. The reaction mixture is hydrolyzed with saturated ammonium chloride solution and the ether phase is separated, washed with sodium chloride solution, dried over magnesium sulfate, and evaporated under reduced pressure. The oily residue is warmed with 30 ml. of methanol and a small amount of crystalline by-product, insoluble in hydrochloric acid, is removed. The methanol filtrate is evaporated to dryness and the residue is dissolved in ether and extracted with 120 ml. of 1 N hydrochloric acid. The acidic extract is made basic and extracted with ether. The ether solution is washed with sodium chloride solution, dried over magnesium sulfate, and evaporated under reduced pressure. The residue is 1-[p-(2-dimethylaminoethoxy)phenyl]-1-phenyl-2-(o-tolyl)ethanol; M.P. 91–93° C. following crystallization from aqueous methanol.

*Example 3*

With stirring, 20 g. of fuming nitric acid is added to a solution of 20 g. of 1-[p-(2-diethylaminoethoxy)phenyl]-1-(p-tolyl)-2-phenylethanol in 200 ml. of acetic acid. The mixture is warmed and stirred at 60–65° C. for 15 minutes, poured into 1000 ml. of ice water, made basic to pH 11 with 50% sodium hydroxide, and extracted with chloroform. The chloroform extract is washed with sodium chloride solution, dried over magnesium sulfate, and evaporated under reduced pressure to give a residue of α - [p - (2 - diethylaminoethoxy)phenyl] - α' - nitro-4-methylstilbene. A solution of 13.5 g. of the free base in 60 ml. of warm methyl ethyl ketone is treated with a solution of 6 g. of citric acid in 70 ml. of methyl ethyl ketone. The insoluble monocitrate salt which precipitates is collected on a filter; M.P. 102–104° C.

*Example 4*

By the procedure of Example 3, with the substitution of 15 g. of 1-[p-(2-diethylaminoethoxy)phenyl]-1,2-bis(p-tolyl)ethanol for the 1-[p-(2-diethylaminoethoxy)phenyl]-1-(p-tolyl)-2-phenylethanol, the product obtained is α - [p - (2 - diethylaminoethoxy)phenyl] - α' - nitro-4,4'-dimethylstilbene. The monocitrate salt, M.P. 102–104° C., is prepared by reacting 9 g. of the free base with 4 g. of citric acid in methyl ethyl ketone.

The starting material, 1-[p-(2-diethylaminoethoxy)phenyl]-1,2-bis(p-tolyl)ethanol, M.P. 69–70° C., is prepared by the general procedure given in Example 2, from 4 - (2 - diethylaminoethoxy) - 4' - methylbenzophenone and p-methylbenzylmagnesium chloride.

*Example 5*

With stirring, 10 g. of fuming nitric acid is added dropwise to a solution of 10 g. of 1-[p-(2-piperidinoethoxy)phenyl]-1-(p-tolyl)-2-phenylethanol in 100 ml. of acetic acid. The mixture is warmed at 65° C. for 10 minutes, poured into ice water, made basic with 50% sodium hydroxide, and extracted with chloroform. The chloroform extract is washed with sodium chloride solution, dried, and evaporated to give a residue of α-[p-(2-piperidinoethoxy)phenyl]-α'-nitro-4-methylstilbene. A solution of 9 g. of this free base in 30 ml. of warm methyl ethyl ketone is treated with a solution of 4 g. of citric acid in 40 ml. of methyl ethyl ketone and the mixture is chilled. The insoluble monocitrate salt is collected on a filter and washed with ether; monohydrate M.P. 96–99° C. The hydrochloride is obtained by treating an ethereal solution of the free base with hydrogen chloride. A salt with pamoic acid, 4,4'-methylenebis(3-hydroxy-2-naphthoic acid), is obtained by mixing aqueous solutions of the hydrochloride and sodium pamoate, and collecting the insoluble product on a filter.

The starting material, 1-[p-(2-piperidinoethoxy)phenyl]-1-(p-tolyl)-2-phenylethanol, M.P. 89–91° C., is prepared by the general procedure given in Example 2, from 4-(2-piperidinoethoxy)-4'-methylbenzophenone and benzylmagnesium chloride.

The 4-(2-piperidinoethoxy)-4'-methylbenzophenone is prepared as follows. A solution of 84 g. of 4-hydroxy-4'-methylbenzophenone in 150 ml. of dimethylformamide is added slowly to a stirred suspension of 18 g. of 50% sodium hydride in 50 ml. of dimethylformamide. A solution of 56 g. of N-(β-chloroethyl)-piperidine in 300 ml. of ether is added and the reaction mixture is heated under partial reflux until most of the ether is removed and the temperature of the distillation vessel is about 90° C. The mixture is stirred at 90° C. for three hours, cooled, and diluted with 400 ml. of ether. The ether solution is washed with water, with 400 ml. of 1 N sodium hydroxide, and with saturated sodium chloride solution, dried, and evaporated. The residue of 4-(2-piperidinoethoxy)-4'-methylbenzophenone is crystallized from aqueous ethanol; M.P. 68–70° C. The other benzophenones useful in the production of starting materials can be prepared by substituting the appropriate 4-hydroxybenzophenone and aminoalkyl halide in this procedure.

*Example 6*

By the general procedure of Example 5, 10 g. of 1-[p-(2-piperidinoethoxy)phenyl] - 1 - (p-tolyl) - 2 - (o-tolyl)-ethanol is reacted with 10 g. of fuming nitric acid in acetic acid solution to give α-[p-2-piperidinoethoxy)-phenyl]-α'-nitro-4,2'-dimethylstilbene. The monocitrate salt is obtained by adding a solution of 2 g. of citric acid in 15 ml. of warm methyl ketone to a solution of 4.5 g. of the free base in 15 ml. of methyl ethyl ketone; M.P. 63–65° C. following recrystallization from methyl ethyl ketone.

The starting material, 1-[p-(2-piperidinoethoxy)phenyl]-1-(p-tolyl)-2-(o-tolyl)ethanol, M.P. 80–83° C., is prepared by the general procedure given in Example 2, from 4-(2-piperidinoethoxy) - 4' - methylbenzophenone and o-methylbenzylmagnesium chloride.

*Example 7*

By the general procedure of Example 5, 10 g. of 1-[p-(2-piperidinoethoxy)phenyl] - 1 - phenyl-2-(p-tolyl)ethanol is reached with 10 g. of fuming nitric acid in acetic acid solution to give α-[p-(2-piperidinoethoxy)phenyl]-α'-nitro-4'-methylstilbene. The monocitrate, M.P. 107° C., is obtained by reacting 4.5 g. of free base with 2 g. of citric acid in methyl ethyl ketone.

The starting material, 1-[p-(2-piperidinoethoxy)phenyl]-1-phenyl-2-(p-tolyl)ethanol, M.P. 90–91° C., is prepared by the general procedure given in Example 2, from 4-(2-piperidinoethoxy)benzophenone and p-methylbenzylmagnesium chloride.

*Example 8*

By the general procedure of Example 5, 10 g. of 1-[p-(2-piperidinoethoxy)phenyl]-1,2-diphenylethanol is reacted with 10 g. of fuming nitric acid in acetic acid solution to give α-[p-(2-piperidinoethoxy)phenyl]-α'-nitrostilbene; M.P. 124–125° C. following crystallization from methanol.

The starting material, 1-[p-(2-piperidinoethoxy)phenyl]-1,2-diphenylethanol, M.P. 60–61° C., is prepared by the general procedure given in Example 2, from 4-(2-piperidinoethoxy)benzophenone and benzylmagnesium chloride.

*Example 9*

Thirteen g. of fuming nitric acid is added gradually to a solution of 13 g. of α-[p-(2-diethylaminoethoxy)phenyl]-4-methoxystilbene in 130 ml. of acetic acid. The mixture is warmed to 60° C. for 15 minutes and poured into ice water, made distinctly basic with 50% sodium hydroxide and extracted with chloroform. The chloroform extract is washed, dried, and evaporated to give α-[p-(2-diethylaminoethoxy)phenyl - α'-nitro - 4 - methoxystilbene. The monocitrate salt is prepared by reacting the free base with citric acid in methyl ethyl ketone solution, M.P. 85–88° C.

The starting material is obtained as follows. A solution of benzylmagnesium chloride is prepared from 3.6 g. of magnesium and 16 g. of benzyl chloride in 150 ml. of ether. To this solution is added with stirring a solution of 23 g. of 4-(2-diethylaminoethoxy)-4'-methoxybenzophenone in 100 ml. of ether. The mixture is heated under reflux for three hours and hydrolyzed by stirring it with saturated ammonium chloride solution. The organic phase is separated, washed with sodium chloride solution, and stirred with 150 ml. of 1 N hydrochloric acid. The acidic aqueous phase is separated, made distinctly basic with sodium hydroxide and extracted with ether. The ether extract is washed, dried, and evaporated under reduced pressure to give a residue of α-[p-(2-diethylaminoethoxy)phenyl]-4-methoxystilbene. The citrate salt, formed by reaction of the free base with citric acid in methyl ethyl ketone solution, has M.P. 95–97° C.

*Example 10*

A solution of 21 g. of 1-[p-(2-diethylaminoethoxy)phenyl]-1-(p-chlorophenyl)-2-phenylethanol in 170 ml. of acetic acid is treated dropwise with 21 g. of fuming nitric acid. The mixture is warmed at 60–65° C. for 15 minutes, poured into ice water, made strongly basic with sodium hydroxide, and extracted with chloroform. The chloroform extract is washed with sodium chloride solution, dried over magnesium sulfate, and evaporated to give α-[p-(2-diethylaminoethoxy)phenyl]-α'-nitro-4-chlorostilbene. The monocitrate, M.P. 93–96° C., is obtained by reacting the free base with citric acid in methyl ethyl ketone.

*Example 11*

Ten grams of fuming nitric acid is added to a solution of 12 g. of 1-[p-(2-pyrrolidinoethoxy)phenyl]-1-(p-chlorophenyl)-2-(p-tolyl)ethanol in 125 ml. of acetic acid. The mixture is warmed at 60° C. for 15 minutes, poured into ice water, made basic with sodium hydroxide, and extracted with chloroform. The chloroform extract is washed with water, dried, and evaporated to give a residue of α-[p-(2-pyrrolidinoethoxy)phenyl]-α'-nitro-4-chloro-4'-methylstilbene. A solution of 9 g. of the free base in 50 ml. of methyl ethyl ketone is added to a solution of 4 g. of critric acid in 40 ml. of methyl ethyl ketone. The insoluble monocitrate is collected on a filter and washed with ether; monohydrate M.P. 95° C.

The starting material, 1-[p-(2-pyrrolidinoethoxy)phenyl]-1-(p-chlorophenyl)-2-(p-tolyl)ethanol, M.P. 111–112° C., is prepared by the general procedure given in Example 2, from 4-(2-pyrrolidinoethoxy)-4'-chlorobenzophenone and p-methylbenzylmagnesium chloride.

The 4-(2-pyrrolidinoethoxy)-4'-chlorobenzophenone is prepared as follows. A solution of 33 g. of p-(2-pyrrolidinoethoxy)benzonitrile in 75 ml. of ether is added to a solution of p-chlorophenylmagnesium bromide prepared from 38 g. of p-chlorobromobenzene and 4 g. of magnesium in 150 ml. of ether. The reaction mixture is heated under reflux for 6 hours, cooled, and hydrolyzed by stirring it with ammonium chloride solution. The ether phase is separated and extracted with 1 N hydrochloric acid. The acidic solution is heated at 90–95° C. for 2 hours, made basic with sodium hydroxide solution and extracted with ether. The ether extract is washed with water, dried, and evaporated and the residue of 4-(2-pyrrolidinoethoxy)-4'-chlorobenzophenone is crystallized from ethyl acetate-petroleum ether; M.P. 97–98° C.

*Example 12*

By the general procedure of Example 5, 1-[p-(2-dimethylaminoethoxy)phenyl] - 1 - phenyl - 2 - (o - chlorophenyl)ethanol is reacted with fuming nitric acid to give α - [p - (2 - dimethylaminoethoxy)phenyl] - α' - nitro-2'-chlorostilbene. A solution of 4.5 g. of this free base in 20 ml. of methyl ethyl ketone is treated with a solution of 2 g. of citric acid in 20 ml. of methyl ethyl ketone and the monocitrate salt which precipitates is collected on a filter and washed with ether; M.P. 80–84° C.

The starting material is obtained as follows. A solution of o-chlorobenzylmagnesium chloride is prepared from 2.5 g. of magnesium and 17 g. of o-chlorobenzyl chloride in 100 ml. of ether. To this solution is added with stirring, a solution of 13 g. of 4-(2-dimethylaminoethoxy)benzophenone in 100 ml. of ether. The reaction mixture is heated under reflux for 3 hours, cooled, and hydrolyzed with ammonium chloride solution. The ether phase is separated, washed, dried, and evaporated to give a residue of 1-[p-(2-dimethylaminoethoxy)phenyl]-1-phenyl-2-(o-chlorophenyl)ethanol; M.P. 101–103° C. following crystallization from ethanol-ether.

*Example 13*

By the general procedure of Example 5, 1-[p-(2-diethylaminoethoxy)phenyl] - 1 - (p - tolyl) - 2 - (o - chlorophenyl)ethanol is reacted with fuming nitric acid to give α - [p - (2 - diethylaminoethoxy)phenyl] - α' - nitro - 4-methyl-2'-chlorostilbene. The monocitrate, M.P. 74–77° C., is prepared by the reaction of the free base with citric acid in methyl ethyl ketone solution.

In the same manner, α-[p-(2-piperidinoethoxy)phenyl]-α'-nitro-4'-fluorostilbene is obtained by the reaction of 1 - [p - (2 - piperidinoethoxy)phenyl] - 1 - phenyl - 2-(p-fluorophenyl)ethanol with fuming nitric acid.

The starting material, 1 - [p - (2 - diethylaminoethoxy)phenyl] - 1 - (p - tolyl) - 2 - (o - chlorophenyl)-ethanol, M.P. 92°–93° C., is prepared by the general procedure given in Example 2, from 4 - (2 - diethylaminoethoxy - 4' - methylbenzophenone and o - chlorobenzylmagnesium chloride. The starting material, 1 - [p - (2-piperidinoethoxy)phenyl] - 1 - phenyl - 2 - (p - fluorophenyl)ethanol, is prepared by the general procedure given in Example 2, from 4 - (2 - piperidinoethoxy)benzophenone and p-fluorobenzylmagnesium chloride.

*Example 14*

By the general procedure of Example 5, 1-[p-(2-diethylaminoethoxy)phenyl] - 1 - (p-chlorophenyl) - 2-(o-chlorophenyl)ethanol is reacted with fuming nitric acid to give α - [p - (2 - diethylaminoethoxy)phenyl]-α' - nitro - 4,2' - dichlorostilbene. The monocitrate, M.P. 82–85° C., is prepared by the reaction of the free base with citric acid in methyl ethyl ketone solution.

In the same manner, α - [p - (2 - diethylaminoethoxy)phenyl] - α' - nitro - 4 - trifluoromethyl - 4' - chlorostilbene is obtained by the reaction of 1-[p-(2-diethylaminoethoxy)phenyl] - 1 - (p - trifluoromethylphenyl)-2-(p-chlorophenyl)ethanol with fuming nitric acid.

In the same manner, α - [p - (2 - pyrrolidinoethoxy)phenyl] - α' - nitro - 3 - trifluoromethylstilbene is obtained by the reaction of 1-[p-(2-pyrrolidinoethoxy)phenyl] - 1 - (m - trifluoromethylphenyl) - 2 - phenylethanol with fuming nitric acid.

The starting material, 1 - [p - (2 - diethylaminoethoxy)phenyl] - 1 - (p - chlorophenyl) - 2 - (o - chlorophenyl)-ethanol, is prepared by the general procedure given in Example 2, from 4 - (2 - diethylaminoethoxy) - 4' - chlorobenzophenone and o-chlorobenzylmagnesium chloride. The starting material, 1 - [p - (2 - diethylaminoethoxy)phenyl] - 1 - (p - trifluoromethylphenyl) - 2 -(p - chlorophenyl)ethanol, M.P. 113° C., is prepared by the general procedure given in Example 2 from 4-)2-diethylaminoethoxy) - 4' - (trifluoromethyl)benzophenone and p-chlorobenzylmagnesium chloride. The starting material, 1 - [p - (2 - pyrrolidinoethoxy)phenyl] - 1 - (m-trifluoromethylphenyl - 2 - phenylethanol, M.P. 128–131° C., is prepared by the general procedure given in Example 2, from 4 - (2 - pyrrolidinoethoxy) - 3' - (trifluoromethyl)benzophenone and benzylmagnesium chloride.

The 4 - (2 - pyrrolidinoethoxy) - 3' - (trifluoromethyl)benzophenone, M.P. 72–75° C., is prepared by reacting p - (2 - pyrrolidinoethoxy)benzonitrile with m - trifluoromethylphenylmagnesium bromide in ether solution and hydrolyzing the reaction product with ammonium chloride solution and then with 1 N hydrochloric acid at 90–95° C., following the general procedure given in Example 11.

*Example 15*

With stirring, 5 g. of fuming nitric acid is added to a solution of 10 g. of 1-[p-(2-pyrrolidinoethoxy)phenyl]-1 - (p - methoxyphenyl) - 2 - phenylethanol in 100 ml. of acetic acid. The resulting mixture is warmed to 60° C. and then poured into 500 ml. of ice water. The diluted mixture is made strongly basic with sodium hydroxide and extracted with chloroform. The chloroform extract is washed with sodium chloride solution, dried over magnesium sulfate, and evaporated under reduced pressure to give a residue of α-[p-2-pyrrolidinoethoxy) phenyl] - α' - nitro - 4 methoxystilbene; M.P. 118–120° C. following crystallization from methanol.

The monocitrate salt is obtained by reacting 4.4 g. of the free base with 2 g. of citric acid in 50 ml. of methyl ethyl ketone; M.P. 81–83° C. The acetate salt is obtained by dissolving 3 g. of the free base in 25 ml. of acetic acid and evaporating the solution under reduced pressure. The sulfate salt is obtained by dissolving 4.5 g. of the free base in 100 ml. of 0.1 N sulfuric acid followed by freezing and lyophilizing the solution.

The methiodide is obtained by treating a cooled solution of 5 g. of the free base in 50 ml. of acetonitrile with 7.5 ml. of methyl iodide, allowing the mixture to stand overnight and then pouring it into 500 ml. of ether and collecting the insoluble product.

The starting material is obtained as follows. A solution of benzylmagnesium chloride is prepared from 5.5 g. of magnesium and 26 g. of benzyl chloride in 250 ml. of ether. To this solution is added with stirring, a solution of 44 g. of 4-(2-pyrrolidinoethoxy)-4'-methoxybenzophenone in 200 ml. of warm tetrahydrofuran. The mixture is heated under reflux for 3 hours and hydrolyzed with 200 ml. of saturated ammonium chloride solution. The organic phase is separated, washed with saturated sodium chloride solution, dried over magnesium sulfate and evaporated under reduced pressure to give a residue of 1 - [p - (2 - pyrrolidinoethoxy)phenyl] - 1- (p - methoxyphenyl) - 2 - phenylethanol; M.P. 119–121° C. following crystallization from ethyl acetate-petroleum ether.

The 4-(2-pyrrolidinoethoxy)-4'-methoxybenzophenone, M.P. 83–85° C., is prepared from 44 g. of 4-hydroxy-4'-methoxybenzophenone, 10 g. of 52% sodium hydride and 51 g. of N-(β-chloroethyl)pyrrolidine, following the general procedure given in Example 5.

The following additional compounds are obtained by the general procedure of this example. From the 1-[p-(2-morpholinoethoxy)phenyl] - 1 - (p-methoxyphenyl-2-phenylethanol, the product is α-[p-(2-morpholinoethoxy) phenyl]-α'-nitro-4-methoxystilbene. From 1-{p-[2-(2,6-dimethylpiperidino)ethoxy]phenyl} - 1-(p-methoxyphenyl)-2-phenylethanol, the product is α-{p-[2-(2,6-dimethylpiperidino)ethoxy]phenyl}-α'-nitro - 4 - methoxystilbene. The starting materials are obtained by reacting 4-hydroxy-4'-methoxybenzophenone in the presence of sodium hydride with N-(β-chloroethyl)morpholine and with N-(β-chloroethyl)-2-6-dimethylpiperdine, followed by reacting the resulting products with benzylmagnesium chloride and hydrolyzing with ammonium chloride solution.

*Example 16*

With stirring, 1.7 ml. of fuming nitric acid is added slowly to a solution of 17 g. of 1-[p-(2-piperidinoethoxy) phenyl]-1-(p-ethoxyphenyl)-2-phenylethanol in 170 ml. of acetic acid. The mixture is heated to 60° C., poured into ice water, made distinctly basic with sodium hydroxide, and extracted with chloroform. The chloroform extract is washed, dried over magnesium sulfate, and evaporated under reduced pressure to give α-[p-(2-piperidinoethoxy)phenyl]-α'-nitro-4-ethoxystilbene; M.P. 132–135° C. following crystallization from methanol.

The starting material, 1-[p-(2-piperidinoethoxy)phenyl]-1-(p-ethoxyphenyl)-2-phenylethanol, M.P. 58–60° C., is prepared by the general procedure given in Example 2, from 4-(2-piperidinoethoxy) - 4'-ethoxybenzophenone and benzylmagnesium chloride.

The 4-(2-piperidinoethoxy)-4'-ethoxybenzophenone is obtained as follows. A mixture of 27 g. of p-hydroxybenzoic acid, 25 g. of phenetole, and 400 g. of polyphosphoric acid is heated at 85° C. for one hour with stirring and then poured into 1500 ml. of cold water. The mixture is extracted with ether and the ether solution is extracted with several portions of 1 N sodium hydroxide. The aqueous phase is separated, cooled, and acidified. The 4-hydroxy-4'-ethoxybenzophenone which precipitates is collected on a filter; M.P. 141–143° C. following crystallization from chloroform. Following the general procedure given in Example 5, 42 g. of 4-hydroxy-4'-ethoxybenzophenone, 8.5 g. of 52% sodium hydride and 44 g. of N-(β-chloroethyl)-piperidine are reacted to give 4-(2-piperidinoethoxy) - 4' - ethoxybenzophenone, M.P. 78–80° C.

*Example 17*

By the procedure of Example 15, 1-[p-(2-piperidinoethoxy)phenyl]-1-(p-methoxyphenyl)-2-(o - chlorophenyl)ethanol is reacted with fuming nitric acid to yield α-[p-(2-piperidinoethoxy)phenyl]-α'-nitro - 4 - methoxy-2'-chlorostilbene. The monocitrate salt, M.P. 63–67° C., is prepared by dissolving 4.5 g. of the free base in 25 ml. of methyl ethyl ketone, adding 2 g. of citric acid in 25 ml. of methyl ethyl ketone and collecting the product on a filter.

The starting material, 1-[p-(2-piperidinoethoxy)phenyl] - 1-(p-methoxyphenyl)-2-(o-chlorophenyl)ethanol, is prepared by the general procedure given in Example 2, from 4-(2-piperidinoethoxy-4'-methoxybenzophenone and o-chlorobenzylmagnesium chloride. The citrate salt, prepared with citric acid in methyl ethyl ketone, has M.P. 74–76° C.

The 4-(2-piperidinoethoxy)-4'-methoxybenzophenone, M.P. 97–99° C., is prepared by the general procedure given in Example 5, from 4-hydroxy-4'-methoxybenzophenone, sodium hydride, and N-(β-chloroethyl)piperidine.

By the general procedure of this example, from 1-[p-(2-diethylaminoethoxy)phenyl]-1-(p-tolyl) - 2 - (p-methoxyphenyl)ethanol), the product is α-[p-(2-diethylaminoethoxy)phenyl]-α'-nitro-4-methyl-4'-methoxystilbene.

*Example 18*

With stirring, 10 g. of fuming nitric acid is added slowly to a solution of 10 g. of 1-[p-(1-methyl-2-dimethylaminoethoxy)phenyl]-1,2-diphenylethanol in 100 ml. of acetic acid. The mixture is then heated at 65° C. for 10 minutes, poured into 600 ml. of ice water, made basic with sodium hydroxide and extracted with chloroform. The chloroform extract is washed with sodium chloride solution, dried over magnesium sulfate and evaporated under reduced pressure to give a residue of α-[p-(1-methyl-2-dimethylaminoethoxy)phenyl] - α'-nitrostilbene. The monocitrate salt is obtained by reacting the free base with citric acid in methyl ethyl ketone.

The starting material, 1-[p-(1-methyl-2-dimethylaminoethoxy)phenyl]-1,2-diphenylethanol, is prepared by the general procedure given in Example 2, from 4-(1-methyl-2-dimethylaminoethoxy)benzophenone and benzylmagnesium chloride.

*Example 19*

With stirring, 2.5 g. of fuming nitric acid is added to a solution of 9.2 g. of 1-[p-(2-diethylaminoethoxy)-phenyl]-1-(m-trifluoromethylphenyl)-2-phenylethanol in 90 ml. of acetic acid. The resulting mixture is warmed to 60° C. for 15 minutes and poured into ice water. The resulting mixture is made basic with sodium hydroxide and extracted with chloroform. The chloroform extract is washed with sodium chloride solution, dried over magnesium sulfate, and evaporated under reduced pressure to give a residue of α-[p-(2-diethylaminoethoxy)phenyl]-α′-nitro-3-trifluoromethylstilbene. The monocitrate salt is obtained by reacting 1.0 g. of the free base with 0.5 g. of citric acid in 10 ml. of methyl ethyl ketone; M.P. 80–85° C. following crystallization from methanol-ether.

The starting material, 1-[p-(2-diethylaminoethoxy)phenyl] - 1 - (m - trifluoromethylphenyl) - 2 - phenylethanol, M.P. 97–98° C., is prepared by the general procedure given in Example 2, from 4-(2-diethylaminoethoxy)-3′-(trifluoromethyl)benzophenone and benzylmagnesium chloride.

*Example 20*

With stirring, 3.5 ml. of fuming nitric acid is added slowly to a solution of 9 g. of 1-[p-(2-pyrrolidinoethoxy)phenyl]-1-(p-ethoxyphenyl)-2-phenylethanol in 90 ml. of acetic acid. The mixture is heated to 60° C. for 10 minutes, poured into ice water, made distinctly basic with sodium hydroxide and extracted with chloroform. The chloroform extract is washed, dried, and evaporated under reduced pressure to give α-[p-(2-pyrrolidinoethoxy)phenyl]-α′-nitro-4-ethoxystilbene. The monocitrate salt is obtained by reacting 1.0 g. of the free base and 0.5 g. of citric acid in 10 ml. of methyl ethyl ketone; M.P. 86–89° C.

The starting material, 1 - [p - (2 - pyrrolidinoethoxy(phenyl] - 1 - (p - ethoxyphenyl) - 2 - phenylethanol, M.P. 60–62° C., is prepared by the general procedure given in Example 2, from 4-(2-pyrrolidinoethoxy)-4′-ethoxybenzophenone and benzylmagnesium chloride.

The 4 - (2 - pyrrolidinoethoxy) - 4′ - ethoxybenzophenone, M.P. 74–77° C., is prepared by the general procedure given in Example 5, from 4-hydroxy-4′-ethoxybenzophenone, sodium hydride, and N-(β-chloroethyl)-pyrrolidine.

*Example 21*

During a period of one minute, with the temperature maintained below 30° C. by a Dry Ice bath, 4.5 g. of 70% nitric acid is added to 30 ml. of acetic anhydride. The mixture is then cooled to −15° C. and two drops of concentrated sulfuric acid is added. Then 10 g. of α - [p - (2 - pyrrolidinoethoxy)phenyl] - 4 - methoxystilbene in 10 ml. of acetic anhydride is added over a period of about 30 seconds with external cooling to maintain the temperature of the reaction mixture below 10° C. The mixture is poured into 150 ml. of water and allowed to stand until the excess acetic anhydride has been hydrolyzed. It is then made basic to pH 10.5 and extracted with chloroform. The chloroform extract is dried over magnesium sulfate, and evaporated under reduced pressure. The residue of 1-(p-methoxyphenyl)-1-acetoxy - 1 - [p - (2 - pyrrolidinoethoxy) - phenyl] - 2-nitro-2-phenylethane is heated at 90–100° C. with 30 ml. of 85% phosphoric acid for one hour. The dark solution is poured into water, made basic with sodium hydroxide, and extracted with chloroform. The chloroform extract is dried and evaporated under reduced pressure to give a residue of α-[p-(2-pyrrolidinoethoxy)-phenyl]-α′-nitro-4-methoxystilbene; M.P. 120° C. following crystallization from methanol.

The starting material is obtained as follows. A mixture of 7 g. of 1-[p-(2-pyrrolidinoethoxy)phenyl]-1-(p-methoxyphenyl)-2-phenylethanol and 25 ml. of 85% phosphoric acid is heated at 90–100° C. for one hour, cooled, and poured into ice water. This mixture is made distinctly basic with sodium hydroxide and extracted with benzene. The benzene extract is dried and evaporated under reduced pressure to give a residue of α-[p-(2-pyrrolidinoethoxy)phenyl]-4-methoxystilbene. The monocitrate, M.P. 92–95° C., is obtained by reacting 6 g. of the free base with 2.8 g. of citric acid in 60 ml. of methyl ethyl ketone.

I claim:
1. A member of the class consisting of compounds of the formula

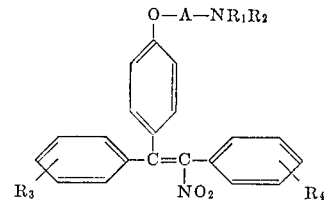

and pharmaceutically-acceptable acid-addition and quaternary ammonium salts thereof, where A is a member of the class consisting of ethylene and propylene; $R_1$ and $R_2$ are members of the class consisting of lower alkyl and further members wherein $R_1$ and $R_2$ are combined and are selected from among
   (a) oxydiethylene and
   (b) lower alkylene of more than 3 and fewer than 9 carbon atoms, more than 3 and fewer than 6 of which are in annular position with the nitrogen atom;

and $R_3$ and $R_4$ are members of the class consisting of hydrogen, lower alkyl, lower alkoxy, halogen, and trifluoromethyl.

2. α - [p - (2 - pyrrolidinoethoxy)phenyl] - α′ - nitro-4-methoxystilbene.

3. Pharmaceutically-acceptable acid-addition salts of α-[p - (2-pyrrolidinoethoxy)phenyl]-α′-nitro-4-methoxystilbene.

4. α - [p - (2 - diethylaminoethoxy)phenyl]-α′-nitro-4-methoxystilbene.

5. α - [p - (2 - diethylaminoethoxy)phenyl]-α′-nitro-4-chlorostilbene.

References Cited by the Examiner

UNITED STATES PATENTS

| | | | |
|---|---|---|---|
| 2,478,243 | 8/1949 | Coe et al. | 260—644 |
| 3,151,148 | 9/1964 | Hughes | 260—465 |

FOREIGN PATENTS 227,566  5/1958  Australia.

OTHER REFERENCES

Bordwell et al.: J. Am. Chem. Soc., volume 82, pages 3588–09 (1960).

Fieser et al.: Organic Chemistry, pages 56–57 (1956).

ALEX MAZEL, *Primary Examiner.*

HARRY R. JILES, *Examiner.*

J. A. NARCAVAGE, *Assistant Examiner.*